US010060274B2

(12) United States Patent
Corten (10) Patent No.: US 10,060,274 B2
(45) Date of Patent: Aug. 28, 2018

(54) TWISTED BLADE ROOT

(71) Applicant: CORTEN HOLDING BV, BH Koedijk (NL)

(72) Inventor: Gustave Paul Corten, BH Koedijk (NL)

(73) Assignee: CORTEN HOLDING BV, BH Koedijk (NL)

( * ) Notice: Subject to any disclaimer, the term of this patent is extended or adjusted under 35 U.S.C. 154(b) by 1018 days.

(21) Appl. No.: 14/406,657

(22) PCT Filed: Mar. 12, 2013

(86) PCT No.: PCT/NL2013/000016
§ 371 (c)(1),
(2) Date: Dec. 9, 2014

(87) PCT Pub. No.: WO2013/137716
PCT Pub. Date: Sep. 19, 2013

(65) Prior Publication Data
US 2015/0159493 A1 Jun. 11, 2015

(30) Foreign Application Priority Data

Mar. 13, 2012 (NL) ...................................... 1039465
Jul. 18, 2012 (NL) ...................................... 1039739

(51) Int. Cl.
*F03D 1/06* (2006.01)
*F01D 5/30* (2006.01)
*F01D 5/14* (2006.01)

(52) U.S. Cl.
CPC ................. *F01D 5/30* (2013.01); *F01D 5/14* (2013.01); *F03D 1/0633* (2013.01);
(Continued)

(58) Field of Classification Search
CPC ........ F03D 1/0633; F03D 1/0641; F01D 5/14; F01D 5/30; F05B 2240/122;
(Continued)

(56) References Cited

U.S. PATENT DOCUMENTS 3,578,264 A 5/1971 Kuethe
4,674,717 A 6/1987 Loebert
(Continued)

FOREIGN PATENT DOCUMENTS

DE 102009025857 12/2009
EP 0845580 6/1998
(Continued)

OTHER PUBLICATIONS

Sharpe, Wind Turbine Aerodynamics, Wind Energy Conversion Systems, 1990, pp. 54-58, Freris, L.L., Great Britain.
(Continued)

*Primary Examiner* — Igor Kershteyn
(74) *Attorney, Agent, or Firm* — Brooks Kushman P.C.

(57) ABSTRACT

A rotor blade for a wind turbine having a blade root, a transition piece and an aerodynamic part, wherein the blade root essentially is optimized for fixation of the blade to the hub and the aerodynamic part essentially is optimized to extract energy from the wind and wherein the transition part realizes a beneficial transition between the blade root and the aerodynamic part. The rotor blade can perform better both aerodynamically and structurally compared to a classic design when the blade part located near the axis, approximately the part between 0% L and 50% L is provided with one or more of the following characteristics: more twist than usual, attached flow stimulating measures at the suction side, flow blocking measures at the pressure side, thicker profiles than usual, a triangular shape of the profile back and back twist.

23 Claims, 6 Drawing Sheets

(52) U.S. Cl.
CPC ...... *F03D 1/0641* (2013.01); *F05B 2240/122* (2013.01); *F05B 2240/301* (2013.01); *F05B 2240/32* (2013.01); *F05B 2250/183* (2013.01); *Y02E 10/721* (2013.01)

(58) Field of Classification Search
CPC ............ F05B 2240/301; F05B 2240/32; F05B 2250/183; Y02E 10/721
See application file for complete search history.

(56) References Cited

U.S. PATENT DOCUMENTS

| | | | |
|---|---|---|---|
| 4,976,587 | A | 12/1990 | Johnston et al. |
| 5,474,425 | A | 12/1995 | Lawlor |
| 5,734,990 | A | 4/1998 | Waring |
| 6,072,245 | A | 6/2000 | Ockels |
| 6,503,058 | B1 | 1/2003 | Selig et al. |
| 6,910,867 | B2 | 6/2005 | Corten |
| 7,299,627 | B2 | 11/2007 | Corten et al. |
| 7,357,622 | B2 | 4/2008 | Corten et al. |
| 7,585,157 | B2 | 9/2009 | Quell et al. |
| 7,914,261 | B2 | 3/2011 | Wobben |
| 7,946,803 | B2 | 5/2011 | Wobben |
| 8,052,394 | B2 | 11/2011 | Petsche et al. |
| 8,061,996 | B2 | 11/2011 | Herr et al. |
| 8,834,127 | B2 * | 9/2014 | Giguere ................ F03D 1/0633 416/228 |
| 2006/0131889 | A1 | 6/2006 | Corten et al. |
| 2006/0232073 | A1 | 10/2006 | Corten et al. |
| 2006/0280614 | A1 | 12/2006 | Quell et al. |
| 2007/0025858 | A1* | 2/2007 | Driver .................... F03D 1/065 416/229 R |
| 2007/0036657 | A1 | 2/2007 | Wobben |
| 2008/0187442 | A1* | 8/2008 | Standish ................ F03D 1/065 416/235 |
| 2008/0206055 | A1 | 8/2008 | Godsk et al. |
| 2009/0074574 | A1 | 3/2009 | Godsk et al. |
| 2009/0202354 | A1* | 8/2009 | Godsk .................. F03D 1/0641 416/223 R |
| 2009/0263252 | A1 | 10/2009 | Slot |
| 2009/0274559 | A1* | 11/2009 | Petsche ................ F03D 1/0641 416/223 R |
| 2010/0141269 | A1 | 6/2010 | Quan |
| 2011/0229332 | A1 | 9/2011 | Fischer et al. |
| 2011/0262281 | A1* | 10/2011 | Petsche ................ F03D 1/0641 416/223 R |
| 2012/0027588 | A1 | 2/2012 | Carroll |
| 2012/0134836 | A1 | 5/2012 | Carroll et al. |
| 2012/0141281 | A1 | 6/2012 | Carroll et al. |
| 2012/0201689 | A1* | 8/2012 | Fuglsang ............. F03D 1/0641 416/235 |

FOREIGN PATENT DOCUMENTS

| | | |
|---|---|---|
| EP | 1152148 | 11/2001 |
| EP | 1845258 | 10/2007 |
| EP | 2194267 | 6/2010 |
| EP | 2343450 | 7/2011 |
| GB | 2265672 | 10/1993 |
| NL | 1012949 | 3/2001 |
| WO | 9011929 | 10/1990 |
| WO | 9201156 | 1/1992 |
| WO | 0015961 | 3/2000 |
| WO | 03067169 | 8/2003 |
| WO | 03104646 | 12/2003 |
| WO | 2004078465 | 9/2004 |
| WO | 2004097215 | 11/2004 |
| WO | 2005035978 | 4/2005 |
| WO | 2006090215 | 8/2006 |
| WO | 2007114698 | 10/2007 |
| WO | 2008113350 | 9/2008 |

OTHER PUBLICATIONS

Erich Hau, "Windkraftanlagen: Grundlagen, Technik, Einsatz, Wirtschaftlichkeit", Translation: "Wind-power plants: Bases, technology, employment, economy", Chapter 5: Aerodynamik Des Rotors, Translation: Aerodynamics of the rotor, 1996, 8 Pages, p. 113-118.
Corten, "Flow Separation on Wind Turbine Blades", Dissertation University of Utrecht 2001, p. 7-16, 11 Pages.
International Search Report for PCT/NL2013/000016, Completed by the European Patent Office dated Feb. 20, 2014, 6 Pages.
Mejia et al. Renewable Energy 2006, vol. 31, p. 383-399, "Simulation of wind energy output at Guajira, Colombia."

* cited by examiner

TWISTED BLADE ROOT

CROSS-REFERENCE TO RELATED APPLICATION

This application is the U.S. national phase of PCT Application No. PCT/NL2013/000016 filed on Mar. 12, 2013, which claims priority to NL Patent Application No. 1039465 filed on Mar. 13, 2012, and NL Patent Application No. 1039739 filed on Jul. 18, 2012, the disclosures of which are incorporated in their entirety by reference herein.

TECHNICAL FIELD

The invention is related to a rotor blade assembly for a wind turbine comprising a blade root, a transition part and an aerodynamic part, wherein the blade root part is optimized essentially for the fixation of the rotor blade to the hub and the aerodynamic part is optimized essentially to extract energy from the wind and wherein the transition part realizes a favorable transient between the blade root and the aerodynamic part.

A cross section of the blade perpendicular to the longitudinal axis of the blade is called a profile. The joint line between two profile points with the largest mutual distance is called the chord. In the case that the trailing edge of the profile is essentially flat, the chord line cuts the flat trailing edge half way. This definition of the chord is also applicable for the determination of the twist. A second definition of the chord progresses analogously with the difference that it is related to the profile without extensions or additions. The largest profile thickness perpendicular to the chord direction is called the thickness, which also is related to the profile without additions or extensions. The relative thickness is the ratio between the thickness and the chord, both with relation to the profile cross section without additions or extensions. In the direction from the tip to the root, the relative thickness usually increases. This is necessary in order to cope with the bending moments and to limit blade bending. Modern rotor blades have a circular cross section near the blade root so that the blade fits easily to the blade bearing. Between the blade root and the more outwardly positioned aerodynamic part of a rotor blade, the transition part is located wherein the profiles transform of e.g. 100% c thickness to e.g. 35% c thickness, which thickness range usually comprises airfoils with low aerodynamic performance. Still, to let this part contribute to the energy-yield, several embodiments are known in literature.

BACKGROUND

An attempt to reach a good aerodynamic performance of the transition part, is to choose the chord near the rotor axis longer than conventional as is described in PCT/EP2004/003294 and PCT/EP03/05605 (Wobben). According to the manufacturer, this option results in a yield increase in the order of 10-15%, however the embodiment is complex, heavy and therefore expensive. Furthermore the total surface of the rotor increases which leads to inter alia higher wind loads, in particular at the survival wind speed, which means further additional costs for the tower and foundation. A variant of this option is described in EP2194267A2 (GE), for which it is also the case that large, expensive and complex additions are required to capture the extra yield. Further developments can be found in US20120134836A1 (GE) and US20120141281A1 (GE), for which always applies that it considers large additions to the blade which leads to large costs and structural problems. An alternative transition part is described in U.S. Pat. No. 6,910,867B2 (Corten) and is also included in EP2343450A1 (LM). Here it is proposed to improve the aerodynamic performance of the part near the blade root to attach flow manipulators such as vortex generators and stagnation strips. This solution is simple and delivers 1½% additional yield, although the majority of the aerodynamic loss in the rotor center persists.

A variant of this solution is described US8052394B2 (Repower), wherein the strip is replaced by a large flow blocking element added to the blade which also characterizes this addition as complex, expensive and risky. Risky references to the probability that a part fixed to the blade root comes loose. Other embodiments of the transition part are described in US2011/0229332 A1 (Nordex) and US2012/0027588A1 (GE). In the first case an addition is proposed which deviates much from a structurally optimal shape. In the second case an addition or extension is proposed of e.g. 10% of the blade length which is fixed to the blade root. This also is a complex, expensive and risky solution. The application of flow blocking Gurney flaps to wind turbine profiles is studied manifold and proves to deliver a lift increase but also a loss due to higher drag. US20100141269A1 (GE) further describes such a flow blocking device. Herein a solution is presented for the fixation of Gurney flaps, which are proposed as flat back folded plates. The problem hereof is that such shapes have a high stiffness and therefore attract forces and thus easily come loose from the blade. Variants of the Gurney flap are additions such as e.g. are described in EP1845258A1 (Siemens) and US2009/0263252A1 (Gamesa). With those additions in the shape of diverging trailing edges, a lower drag is claimed, however compared to profiles without additions one does not reach considerably more lift, so that a disadvantageous large chord is required to achieve maximum efficiency and furthermore the flat trailing edges are structurally and production technically disadvantageous and therefore expensive.

Since the moment of the aerodynamic forces increases with decreasing distance to the shaft and because the area swept by a blade section and thus also the share in the energy yield decreases with decreasing distance to the shaft, a blade cross section is optimized from essentially aerodynamic to essentially structural in the direction from the tip to the axis. This means that profiles near the rotor axis are relatively thick with the disadvantage of aerodynamic loss. The wish of the structural engineer would be to choose starting from the blade root up to 80% radial position a profile thickness which is (much) more than the aerodynamically optimal thickness of 15-18% to create more building height so that a lighter blade design is achievable. However the ratio between lift and drag decreases with increasing relative profile thickness and furthermore the roughness sensitivity increases much with increasing relative profile thickness. Still the designer will be forced to apply thick airfoils for structural reasons with a reduction of yield as consequence.

A complication of the problem with wind turbine blades is that the optimum chord essentially is inversely proportional to the radial position and that a large chord is required at the blade root side of the blade to optimally extract energy from the flow. At the same time the swept area near the rotor center is relatively small so that the relative contribution to the yield of the inner part of the blade is small. The needed large chord and the relatively low contribution to the yield are reason for many manufacturers to choose the chord near the blade root shorter than optimal, so that the yield is reduced.

Another complication arrives from the twist of the angle of attack of the air flow to the profile in the direction from the tip to the axis: from more in the rotor plane to almost parallel to the axis the blade root. Therefore a modern rotor blade is twisted, which means that the chord line of the airfoils in the direction from tip to root is turning. The number of degrees of twist in the length direction is called the twist or the twist difference and is e.g. 10°-12° for classic blades. Thanks to the twist, the profiles are optimally adjusted to the flow, at least in the aerodynamic part of the blade. In the transition part, the inflow angle turns fast with decreasing distance to the axis. This fact together with the fact that optimum angle of attack for a profile decreases with increasing relative profile thickness, means that much twist is required to set the profiles at the correct angle. The large twist over a small radial distance (high twist rate) leads to structural problems and not to much extra energy and therefore the designer chooses not to further twist the transition part e.g. the part between 0% L and 20% L or that between 5% R and 20% R. An additional argument for this is that conventional computer codes to calculate the yield such as Blade Element Momentum codes or CFD codes estimate that adding twist in the transition part hardly has a yield benefit, e.g. less than 1%.

A final complication is that extreme loads to a wind turbine often occur at survival wind speed when the turbine is halted. Then the blade surface is the determining factor for the magnitude of the forces. Therefore the designer would like to choose the blade as small as possible, however due to moderate lift coefficients and relatively thick airfoils at the inner side of the rotor, he is forced to choose a large chord (in order to reach an acceptable energy yield), with consequently high loads at extreme wind speeds and thus a heavy and expensive structure.

SUMMARY

The aim of the invention is to realize a rotor blade so that the yield inter alia from the rotor center increases in such a way that the above described disadvantageous are avoided.

It is found that—in contradiction to the classical though— in the rotor center a blade design is possible that both from aerodynamic and structural point of view is more beneficial than classical designs and that this design can be realized in a simple manner by providing one or more of the following 6 characteristics at the blade part located near the axis, about the part between 0% L and 55% L: more twist than usual, attached flow stimulating measures at the suction side, (radial) flow blocking measures at the pressure side, thicker airfoils than usual, a triangular shape of the profile trailing part and back twist.

Entirely in contradiction to governing views, it is found that twisting the transition part certainly does lead to a relevant increase of yield and that with a thorough choice of the twist distribution, the blade can be produced as easy and that the blade performs structurally good or even better wherein the classical blade is always the reference.

The further surprising conclusion is that according to an embodiment of the invention, the relative profile thickness in the transition part can be chosen larger than usual so that a structural advantage is created and that by application of boundary layer manipulators, the aerodynamic performance further increases inter alia when both at the pressure side and at the suction side of the airfoil flow manipulators are provided. Said flow manipulators are small, cheap and reliable elements which can be attached to the blade easily, e.g. with double sided adhesive tape possibly combined with screws or by any other possible conventional method of attachment wherein the elements are attached to the blade surface directly or in a recess in the blade.

Due to the invention the designer can use a more or less ideal transition part which performs considerably better if one accounts for aerodynamic, structural and production technical arguments.

According to the invention and in contradiction to what is considered by the designer of rotor blades as a fact, airfoils with a thickness of more than 30% c, and in particular of more than 40% c and more in particular of more than 50% c can have good aerodynamic performance provided that they are provided with vortex generators at the suction side and flow blocking measures at the pressure side. Shown is that those thick airfoils then achieve maximum lift coefficients of 2.0 or even 2.5 in a large angle of attack range and that the ratios between lift and drag are above 20, 30 or even 40. By the high thickness and certainly when they are combined with a triangular trailing part, the profiles are suitable to transfer high bending moments. This way a blade design is created which is lighter than classical designs.

A beneficial embodiment of a rotor blade according to the invention delivers approximately 2-8% additional yield, 1-3% weight reduction and easier transportation, without increase of costs.

According to governing views of persons skilled in the art, a maximum additional yield of 1% is possible by designing the transition part differently. The explanation is inter alia that the person skilled in the art designs rotor blades with so-called blade element momentum theory (BEM) which comprises a too simple model of the physics to show the advantage of blades according to the invention. BEM does e.g. not account for a tip loss at the blade root. Furthermore the 3D-corrections known from literature assume that profiles near blade axis reach much more lift and perform well up to much higher angles of attack then under 2D-conditions so that the person skilled in the art thinks that the omission of twist in the transition part hardly introduces disadvantage. A new insight of the inventor shows a different reality: the thick cylindrically shaped profiles of the transition part near the rotor center produce a wake of detached air which by rotational effects (read centrifugal forces and the reduction of pressure in the wake with increasing radial position) flows outwardly towards the suction sides of more outwardly located profiles, which experience a reduction of lift which occurs up to 30%-40%-50% of the rotor radius. This effect is opposite to the expectation of the designer. A second new insight of the inventor is that the detached air at the pressure side of the profiles near the blade root also flow outwardly by rotational effects so that at the pressure side due to the great bulging of the root profiles at the pressure sides negative pressures are created which reduce the lift of the profile as a whole.

Embodiments of the rotor blade according to the invention at the transition part the lift coefficient can reach values above 1.5, or above 2.0 and even above 2.5 for airfoils with a relative thickness of more than 30% c, 40% c, 50% c and even 60% c, so that in a significant blade part where the chord reduces in the direction from blade tip to blade root about the optimum lift can be realized. This means that without increase of the chord and without structural disadvantage, the radial position wherein the blade reaches high aerodynamic efficiency shift in the direction of the blade root from 30% R-40% R to 5% R-20% R. The embodiments from the references do not commit to the demand to reach a high lift coefficient by a relatively simple method. The strip and the vortex generators from U.S. Pat. No. 6,910,867B2

(Corten) cause a large wake which leads to a lift reduction at a larger radial position and requires the addition of twist according to the invention. The embodiments with a diverging trailing edge of other additions or extensions at the trailing edge or at the pressure side are complex but ineffective in reaching a high lift coefficient. Those embodiments reach the beneficial high lift coefficients when, according to an embodiment of the invention, at the suction side attached flow is stimulated e.g. by vortex generators optionally in combination with additional twist and in particular when the pressure side comprises flow blocking elements with a concavity at the pressure side of said elements.

According to an embodiment of the invention the twist varies more than 3°, in particular more than 5°, more in particular more than 10° and even more in particular more than 15° in the continuous range which comprises profiles with a relative thickness between 25% c and 70% c or between 33% c and 70% c or between 40% c and 70% c.

According to another beneficial embodiment of the invention the twist difference is at least 3°, in particular 6° and more in particular 10° in the continuous blade part with profiles with a relative thickness between 50% c and 70% c.

A beneficial embodiment is that wherein the assembly in the longitudinal range below 25% L in particular below 21% L and more in particular below 15% L, comprises 3° twist. A different beneficial embodiment is that wherein the assembly in the longitudinal range of 10% L to 25% L and in particular to 21% L and more in particular to 15% L, comprises 5° and in particular 10° and more in particular 15° twist or wherein said assembly in the longitudinal range from 5% L to 25% L, in particular to 21% L and more in particular to 15% L, comprises 10° and in particular 15° and more in particular 20° twist.

A beneficial variant of the embodiment is that wherein the twist distribution follows from 50% radial position globally a 1/r distribution to 10% R, or even 5% R or up to the blade root, wherein, in contradiction to the invention described in the said applications by Wobben, the blade twists in the part between the blade root and the largest chord. Another combinable beneficial embodiment is that wherein the twist rate between 10% L and 21% L is at least 0.5° per percent blade length, in particular at least 0.75° per % L and more in particular at least 1 degree per % L, wherein the upper longitudinal limit also can have the particular value 18% L and the more particular value of 15% L. Another beneficial embodiment is that wherein the blade in the direction from the tip to the blade root in the range below 80% L comprises at least 10° twist in a first direction and subsequently back-twists in opposite direction over at least 3°, in particular at least 6° and more in particular at least 10° in the longitudinal range with profile thicknesses of less than 97% c, so that the advantages is created that the blade division line in the mould turns back to the horizontal plane near the blade root which simplifies the production.

A beneficial embodiment is one wherein the range of profiles with a chord larger than 105% of the blade root located between L=0 and the largest chord, comprises a twist of 5°, in particular 10° and more in particular 15°.

A further beneficial embodiment is one wherein the rotor blade between 5% L and 25% L in the trailing half of the profile is provided with a flow blocking measures and wherein the rotor blade is provided with vortex generators on the suction side in the range between 5% L and 25% L. An embodiment according to the invention comprises a rotor blade with a chord distribution which in the direction from the tip to the blade root first essentially increases, then reaches a maximum value and subsequently decreases wherein the blade twists by e.g. more than 3°, in particular more than 5°, more in particular more than 10° and preferably about 15°-20°, in the longitudinal range between the maximum chord and the blade root, wherein the largest chord e.g. is located at a longitudinal position larger than 18% L and in particular larger than 24% L and more in particular larger than 30% L.

A beneficial embodiment according to the invention is one wherein the rotor blade in the longitudinal range between the maximum chord and the blade root is provided with flow manipulators which prevent stalling at the suction side such as e.g. vortex generators, boundary layer suction of flow guiding flaps, which can be attached as separate parts or which are integrated with the blade.

Further benefit is realized when between the blade root and 50% L or on profiles with a thickness of more than 40% c, the blade comprises vortex generators with a fin height above the blade surface of more than 2% c, in particular more than 3% c and more in particular more than 5% c. Those vortex generators are higher than known from prior art and stick out of the boundary layer which can be understood since their task is inter alia to feed away radial flow from separated zones near the blade root towards the suction side of more outwardly located profiles, so that the efficiency of those more outwardly located profiles increases. It is found that more advantage is realized when those high vortex generators are combined with a second row of vortex generators at a larger chord wise position and with a lower fin height.

Further advantage is realized according to the invention when the rotor blade in the longitudinal range between 0% L and 80% L and in particular between 10% L and 50% L comprises a flow blocking measures at the pressure side. An embodiment of a flow blocking measures is one in the shape of a edge which extends from the profile surface by e.g. a distance between 0.5 mm and 10% of the local chord and in particular over a distance between 0.2% c and 3% c and more in particular by a distance between 0.5% c and 1.5% c. An inventor thought which underlies the invention is that classical flow blocking elements essentially extending in longitudinal blade direction do not effectively block the flow. The classic designs are inter alia resulting from wind tunnel tests with wind turbine blades in 2-dimensional flow or from CFD-simulations of aerodynamic behavior of wind turbine profiles in 2D-conditions with such a flow blocking element. According to the inventor it is found that due to the rotation of the wind turbine blades and the resulting radial pressure gradients and centrifugal and Coriolis forces, the flow moves in radial direction from the blade root to the tip and that effective flow blockage also requires obstruction of the radial flow over the blade. We will call a flow blocking measure which is designed so that also the radial flow is obstructed a radial flow blocking element, where it should be understood that such an element not only hinders flow in radial direction but also flow in chord wise direction. A beneficial embodiment according to the invention of a radial flow blocking element is one of which the cross section with a plane parallel to the blade surface at the location where the element is located is shaped concave or convex. A characteristic of radial flow blocking elements is that the shape (of a single element or of a group of elements) differs essentially from a longitudinally in blade length direction extending pultrusion. The radial flow blocking elements are (together) three dimensionally shaped and thereby differ regarding function and shape from flow blocking elements as e.g. the 'flow guidance device' in EP2343450A1 (LM) or strip in U.S. Pat. No. 6,910,867B2 (Corten).

An integration option is that wherein the edge of the main girder located at the pressure side near the leading edge protrudes so that a flow blocking element is formed. Further advantage arises according to the invention when a flow blocking measures comprises an element which extends in blade length direction by less than 100 cm, in particular by less than 45 cm and more in particular by less than 25 cm and optionally that every element comprises 2 joints. Further benefit arises according to the invention when the rotor blade comprises at the pressure side a radial flow blocking element which comprises a fixation plane and a flow blocking plane wherein the average plane through said flow blocking plane has an angle with the blade longitudinal direction of at least 10°, in particular with at least 20° and more in particular by at least 30° and or wherein the fixation plane extends according to a curve more or less in the length direction of the blade and that this plane has an angle with the over the flow blocking surface averaged normal of less than 80° in particular of less than 70° and more in particular of less than 60°.

A further beneficial embodiment according to the invention is that wherein the rotor blade comprises a flow blocking measures in the form of an outstretched element which at least comprises 2 zigzag of curved periods with which the radial flow blocking element repeats which is attached at the pressure side, possibly to the trailing edge. Such an element is comparable to a Gurney flap although it has the essential benefits that the flow blockage is improved since also radial flow is obstructed and that the element can be fixed to the blade easily and reliably because the element can easily follow deformations. An example of such a radial flow blocking element is that of an erected curved strip or zigzag strip wherein such a strip is fixed to the rotor blade with a fixation surface which is not continuous in the direction wherein the strip extends (e.g. comprises at least 2 joints with the blade). The classical straight shaped flow blocking elements with a continuous joint over length >45 cm cannot follow thermal expansion differences of bending of the rotor blade and are proven to come loose after a while. The wavy or zigzagged embodiments of radial flow blocking elements smaller than 100 cm or 45 cm or 25 cm according to the invention can follow deformations or can cope with thermal expansion differences due to the limited dimensions so that the joint to the blade is reliable.

The radial flow blocking element or the flow blocking element according to the invention can be applied to the rotor blade as separate part of being integrated therewith. Said elements can e.g. be attached with double sided adhesive tape, screws, glue, dovetails, magnets and all other known attachment methods.

Further advantage arises according to the invention when the rotor blade is provided with artificial roughness which is located e.g. between 1% c at the suction side to, via the leading edge, 50% c at the pressure side and in particular in the range between 0% c and 10% c at the pressure side and more in particular between 1% c at the pressure side to 5% c at the pressure side. This artificial roughness can exists of any in technology known type of roughness such as sand paper, rough paint, zigzag tape, protruded edges, small vortex generators, ribs and can be attached during the blade manufacturing or after that and has as benefits that the maximum negative lift of the airfoils is reduced, that the roughness dependence is reduced and that it can be easily and reliable attached. The application of artificial roughness to wind turbine blades is a measure according to the invention which is opposite to what will be proposed by the person skilled in the art: he would state that wind turbine blades should be produced as smooth as possible.

Further advantage arises by combining the artificial roughness with vortex generators, which increase the maximum positive lift coefficient (or recover to the value without roughness) and an essentially roughness insensitive profile with high lift coefficient is realized, so that a rotor blade under clean conditions (new blade) does not reveal higher lift (read higher costs) compared to standard contaminated conditions which will occur weeks or years after commissioning so that the wind turbine design does not need to be resistant against higher loads during clean periods and thus can be produced more optimal (cheaper).

A further beneficial embodiment according to the invention considers a rotor blade which when attached to a horizontal axis wind turbine and when adjusted to the blade angle corresponding to the maximum power coefficient at the optimum tip speed ratio comprises a profile at radial position 16% R of which the suction side at 95% c has an angle with the rotor plane which is between 0° and 16° and in particular between 3° and 13° and more in particular between 6° and 10° and or comprises a profile at radial position 20% R of which the suction side at 95% c has an angle with the rotor plane between 2° and 17° and in particular between 5° and 13° and more in particular between 7° and 11°.

According to a beneficial embodiment according to the invention the rotor blade comprises a profile at 15% L of which the part behind the back shearweb up to the trailing edge is essentially triangular wherein the profile outer contour maximally deviates 5% c and in particular maximally 3% c and more in particular maximally 2% c of two sides of an imaginary triangle fully inside the profile back side of which the third side coincides with the back shearweb. Further advantage arises according to the invention when the rotor blade comprises a profile at 15% L of which the suction side between 55% c and 98% c has less change of inclination than 8°, in particular less than 6° and more in particular less than 4° and or whereof the pressure side between 45% c and 98% c has less change of inclination than 14°, in particular less than 12° and more in particular less than 8°. Such a triangular back provides in combination with vortex generators at the suction side and possibly a flow blocking element or radial flow blocking element at the pressure side both a good aerodynamic performance and high structural stiffness: The triangular profile back is structurally stiff and will not buckling of the blade skin in contradiction to e.g. the form in US2009/0263252 A1 (Gamesa) so that weight and costs are lower.

It is found that thicker airfoils according to the invention with vortex generators at the suction side and possibly flow blocking measures at the pressure side have a higher lift over drag ratio and lower roughness sensitivity and obviously a higher stiffness due to the higher thickness. Advantageous embodiments of a rotor blade according to the invention therefore apply relatively thick airfoils at relatively large radial positions, wherein relative refers to classical blade designs:

According to a beneficial embodiment of the invention, at 20% L the profiles have a thickness of 45% c, in particular of 50% c and more in particular of 55% c. According to a beneficial embodiment of the invention, at 30% L the profiles have a thickness of 35% c, in particular of 38% c and more in particular of 41% c. According to a beneficial embodiment of the invention, at 40% L the profiles have a thickness of 31% c, in particular of 33% c and more in particular of 37% c. According to a beneficial embodiment of the invention, at 50% L the profiles have a thickness of 30% c, in particular of 32% c and more in particular of 35% c. According to a beneficial embodiment of the invention, at 60% L the profiles have a thickness of 28% c, in particular of 30% c and more in particular of 32% c. According to a beneficial embodiment of the invention, at 70% L the profiles have a thickness of 25% c, in particular of 27% c and more in particular of 29% c.

According to a beneficial embodiment of the invention, at 80% L the profiles have a thickness of 22% c, in particular of 24% c and more in particular of 26% c.

Further advantage arises according to the invention when the largest chord is located at a longitudinal position of more than 24% L and in particular of more than 30% L and more in particular of more than 35% L and or wherein the largest chord is less than 6.5% L, in particular less than 6% L and more in particular 5.5% L. A special embodiment is that wherein the blade has its largest chord at longitudinal position 0 and comprises in the direction of the tip initially a constant chord and subsequently a decreasing chord. The shift of the maximum chord to larger radial position (larger longitudinal position) and the reduction of the largest chord are both consequences thanks to the invention of profiles with large relative which reach high aerodynamic lift so that blades can be built lighter (due to the larger building height) and are easier transportable (due to the reduced maximum chord) and experience lower loads at extreme wind speeds (due to the reduced chord).

A beneficial embodiment according to the invention is one wherein the largest chord is at least equal to the blade root diameter and not more than 130%, in particular not more than 120% and more in particular not more than 110% thereof.

Another beneficial embodiment is that wherein the rotor blade from blade root to the tip is one piece. Finally a beneficial embodiment according to the invention is that wherein the rotor blade length L is larger than 40 meters, in particular larger than 60 and more in particular larger than 80 m. With increasing size of wind turbines the bending moments increase faster than the yield, so that savings by better optimization increasingly is beneficial. For example with increasing turbine size the relative thickness of rotor blades increases to resist optimally the relatively higher bending moments. The disadvantage hereof is the reducing aerodynamic performance. The invention takes away this disadvantage.

A rotor blade assembly according to an embodiment of the invention comprising flow manipulators such as e.g. vortex generators, flow blocking elements or radial flow blocking elements of which the form, size, orientation and location on the blade influence the impact to the blade characteristics. According to a beneficial embodiment of a rotor blade assembly according to the invention the characteristics are optimized for a certain wind climate and for a certain wind turbine. This way, according to the invention, a first rotor blade assembly comprises a first pattern which is optimized for a first situation and a second rotor blade assembly essentially with the same shape comprises a second pattern of flow manipulators which is optimized for a second situation. E.g. a rotor blade for a site with high blade surface contamination can be provided with a in longitudinal direction and or in chord wise direction more extensive pattern of artificial roughness and or a in longitudinal direction more extensive pattern of vortex generators compared to an equal rotor blade for a site with low blade surface contamination. According to another example a rotor blade assembly can be accurately adjusted per site or per turbine by the pattern of flow manipulators within the allowable load envelope of the blade or the turbine.

DETAILED DESCRIPTION

Figure 1:
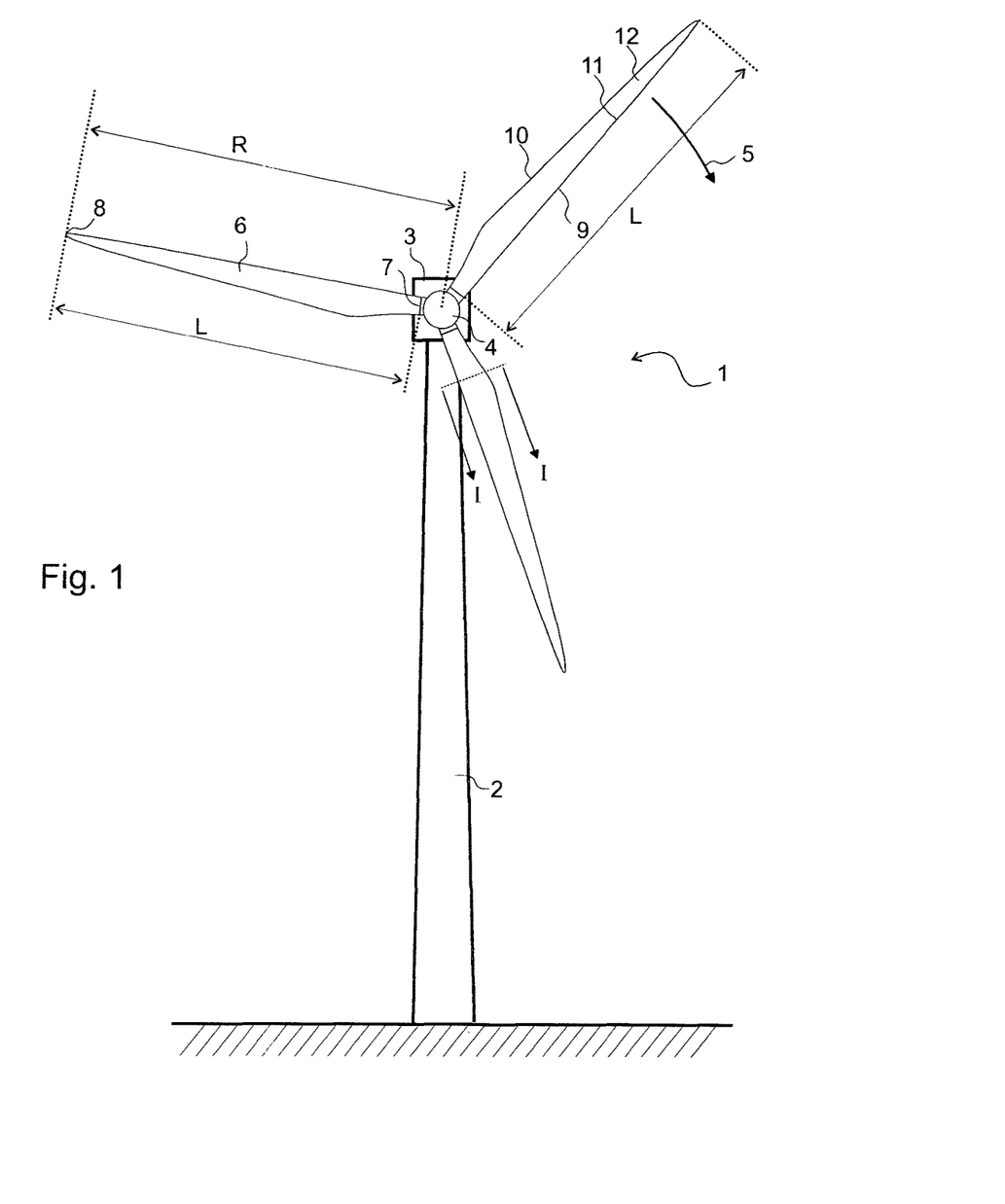
FIG. 1: Horizontal axis wind turbine.

Detailed description of the invention with examples according to figures:

FIG. 1 shows a horizontal axis turbine 1 with a tower 2, a nacelle 3 and a hub 4 with thereto attached rotor blade 6 with blade root 7 and tip 8. Also another rotor blade is shown with leading edge 9 and trailing edge 10, which blade comprises 2 parts: the part attached to the hub and the part 12 which e.g. can adjust the blade pitch angle. The parts come together at position 11. The direction of rotation is 5. Cross section I-I is shown in FIG. 2.

Figure 2:
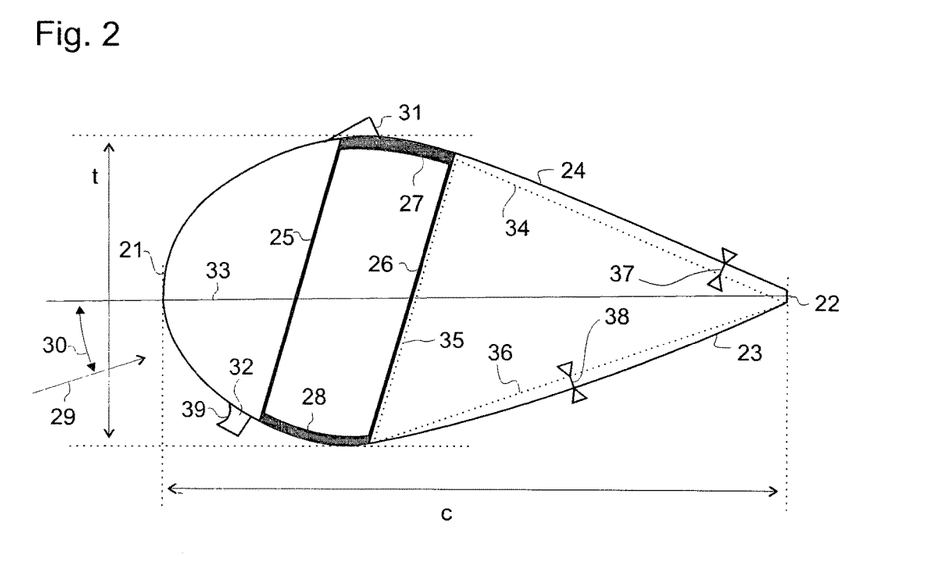
FIG. 2: Cross section of rotor blade according to line I-I in FIG. 1,
FIG. 3: Cross section of rotor blade.

In FIG. 2 the chord c and the thickness t are indicated and also chord line 33 which at chord wise position 0% c coincides with the leading edge 21 and oat chord wise position 100% c with the trailing edge 22. The cross section shows the main girders 27 and 28 at respectively the suction side 24 and the pressure side 28, with in between the front shearweb 25 and the back shearweb 26. An example of a design inflow 29 is shown which has an angle of attack 30 with the chord line 33. The flow manipulators 31 and 32 show respectively vortex generators and a flow blocking element which optionally is comprised with a concavity 39 at the pressure side. The triangle defined by sides 34, 35 and 36 is inside the profile back side. Side 35 coincides with the back shearweb, and sides 34 and 36 have maximum distances 37 and 38 to the outer contour of the profile.

Figure 3:
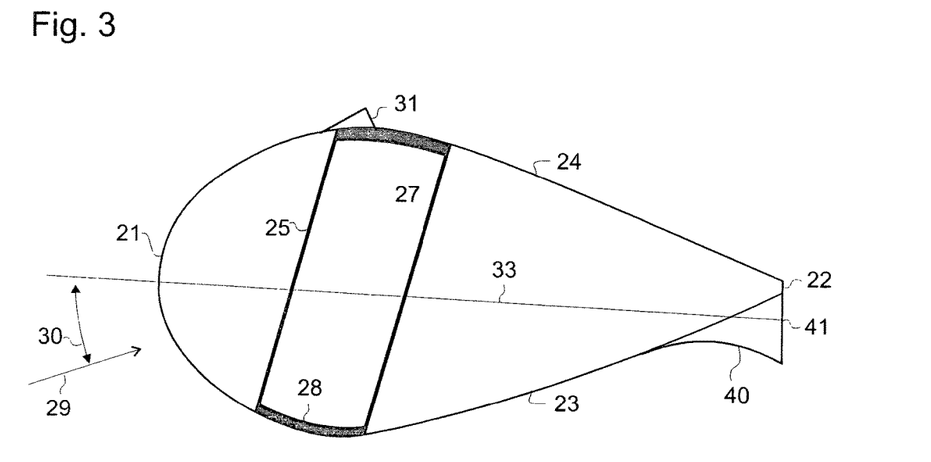

FIG. 3 shows the same cross section, although this time with a diverging trailing edge realized by addition 40. Note that the chord definition which is applied for the twist definition in this application intersects at the back side the middle of the flat trailing edge. The definitions of the chord and thickness in this application which are relevant for the relative thickness should be determined without extensions or additions 40, 50, 51, 53.

Figure 4:
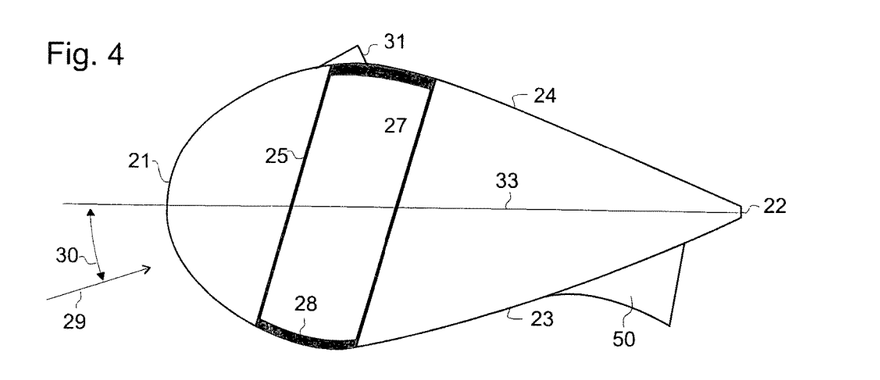
FIG. 4: Cross section of rotor blade.

FIG. 4 shows a cross section with a flow blocking element 50 which is located closer to the leading edge than in FIG. 3.

Figure 5:
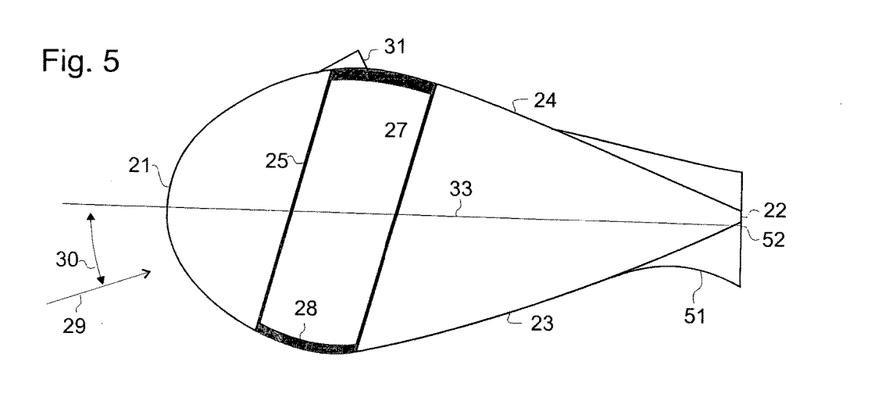
FIG. 5: Cross section of rotor blade.

FIG. 5 shows addition 51 which extends over both the pressure side and the suction side.

Figure 6:
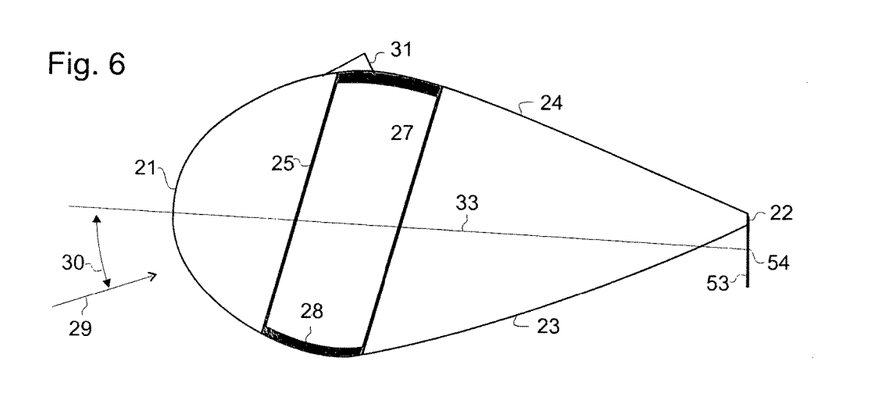
FIG. 6: Cross section of rotor blade.

FIG. 6 shows flow blocking element 54 in the form of Gurney flap. The chord line again intersects the flat trailing edge half way.

Figure 7:
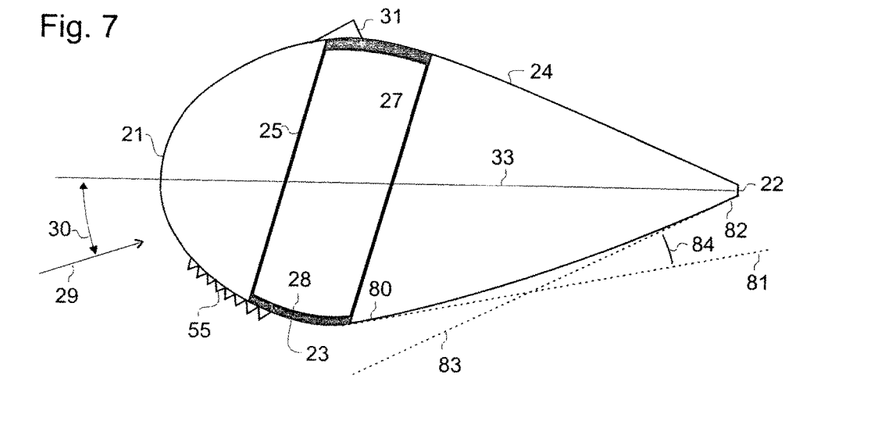
FIG. 7: Cross section of rotor blade.

FIG. 7 shows artificial roughness 55, which provides an effective flow blockage, can be attached easily, which reduces the roughness sensitivity of the blade and which opposes high negative pressure gradients. Between position 80 at the pressure side at approximately 45% c and position 82 at approximately 98% c the tangents 81 and 82 show the difference in slope 84 of the profile contour.

Figure 8:
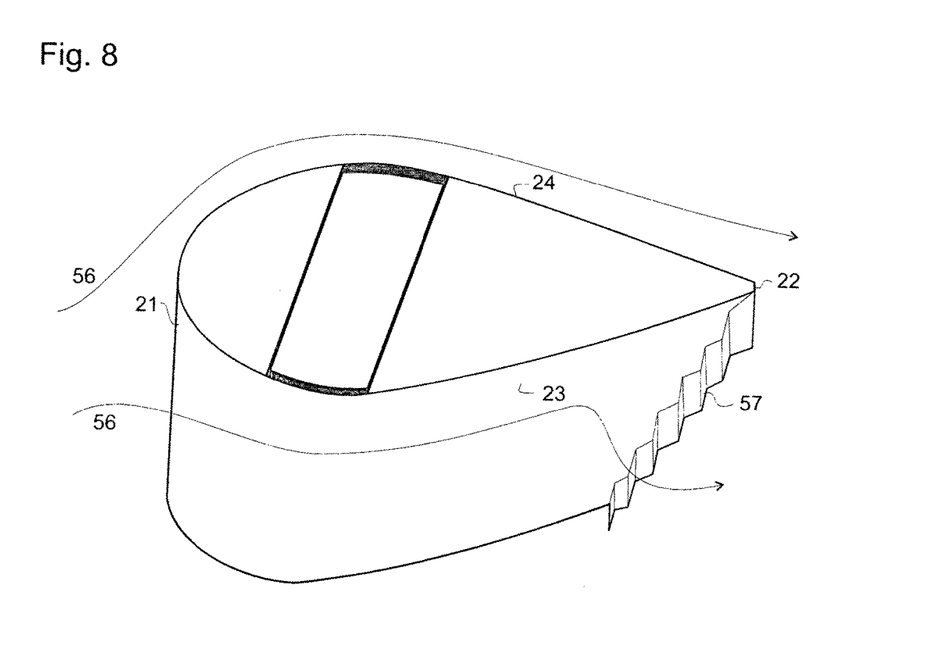
FIG. 8: Cross section of rotor blade with zigzag profile at pressure side.

FIG. 8 shows a 3D view of flow lines 56 and radial flow blocking element 57. FIGS. 9, 10, 11 and 12 show a view at the pressure side of (a part of) a rotor blade.

Figure 9:
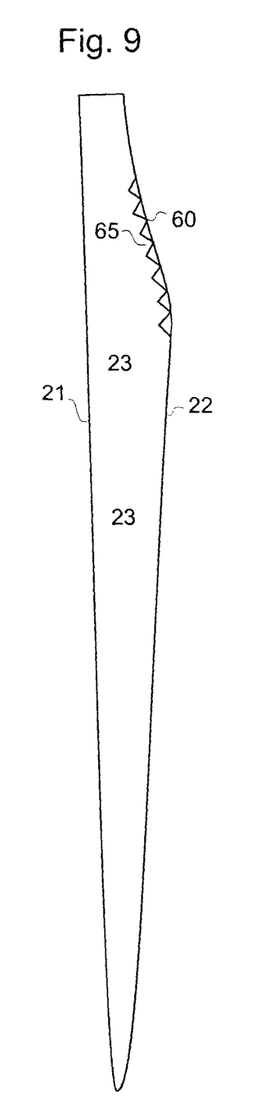
FIG. 9: Rotor blade.

FIG. 9 shows radial flow blocking element 60 with a zigzag pattern and multiple concavities 65 at the pressure side thereof of which one is indicated.

Figure 10:
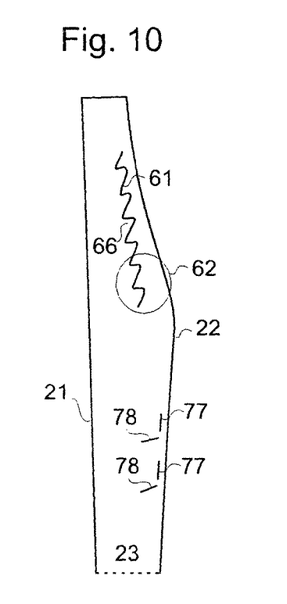
FIG. 10: Rotor blade.
Figure 12:
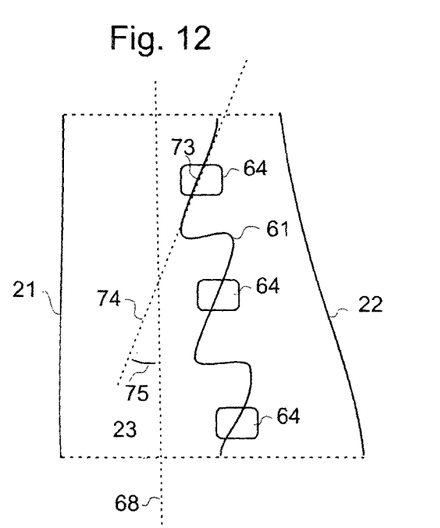
FIG. 12: Close up of part 62 in FIG. 10,
FIG. 13: Twist and chord distribution.

FIG. 10 shows radial flow blocking element 61 with wavy pattern and close up 62 which is shown in FIG. 12. Element 61 comprises at its pressure side concavities 66 of which one is indicated.

Figure 11:
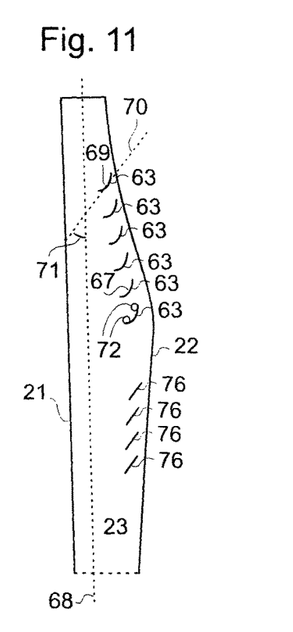
FIG. 11: Rotor blade.

FIG. 11 shows radial flow blocking elements 63 with a concave inflow side 67 (just one concavity indicated). On a single element 63 is ay position 69 the plane 70 through door the flow blocking plane drawn which has an angle 71 with the blade longitudinal axis 68. The normal to plane 70 is not perpendicular to the curve which connects elements 63. Element 63 can, due to its small dimensions, over maximally its full length be joint to the blade or has 2 or more non-continuous joints 71 with the blade. A shown embodiment of element 63 comprises 2 joints 71 which connect element 63 to the blade, e.g. by double sided adhesive tape. According to a beneficial embodiment the flow blocking surface of element 63 does not touch the blade surface, but instead allows air to flow between the element 63 and the blade surface over a height of e.g. 0.01% c to 2% c or in particular between 0.1% c and 0.5% c. By inclining the flow blocking surface by an angle with said curve as shown in FIGS. 8-12 a more effective blockage of the flow is realized, which can be understood since rotational effects will drive stagnant flow outwardly (centrifugal forces) what is not obstructed in the case of longitudinal embodiments as in U.S. Pat. No. 6,910,867 B2 (Corten) and EP2343450A1 (LM), but (partly) is blocked by the embodiments according to the invention. FIG. 12 shows a close up of part 62 in FIG. 10.

FIG. 12 shows again the radial flow blocking element 61 with the wavy pattern and also the joint surfaces 64 which are in the direction wherein the element extends in not continuous. At position 73 the plane 74 through the radial flow blocking surface is drawn and has an angle 75 with the blade longitudinal axis 68.

Figure 13:
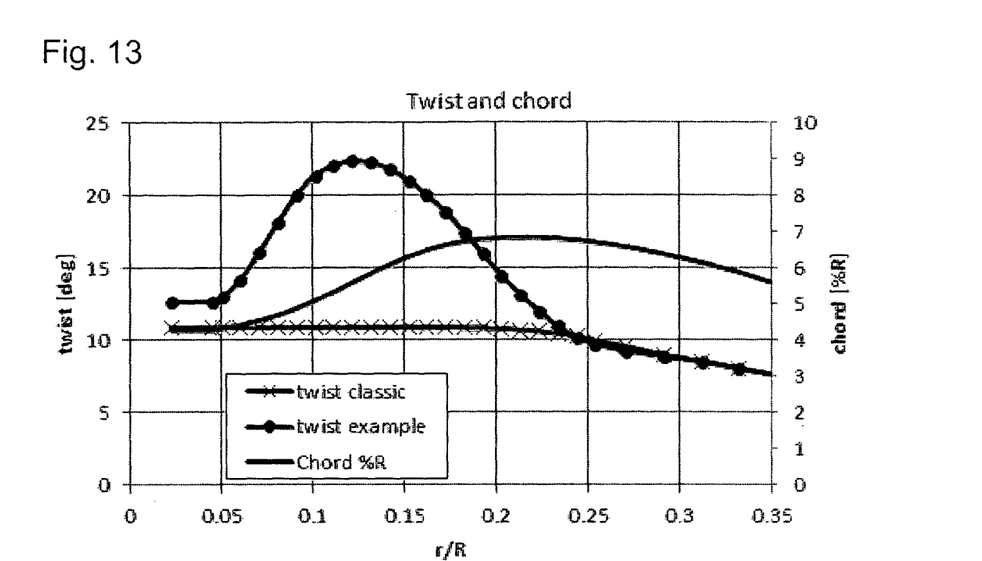

FIG. 13 shows the distribution of the twist and the chord according to an embodiment according to the invention and also a classical twist distribution. In the figure the twist difference according to this embodiment of the invention between 15% R and 20% R 5° and is the back twist between 5% R and 10% R also 5° or even 7°.

Figure 14:
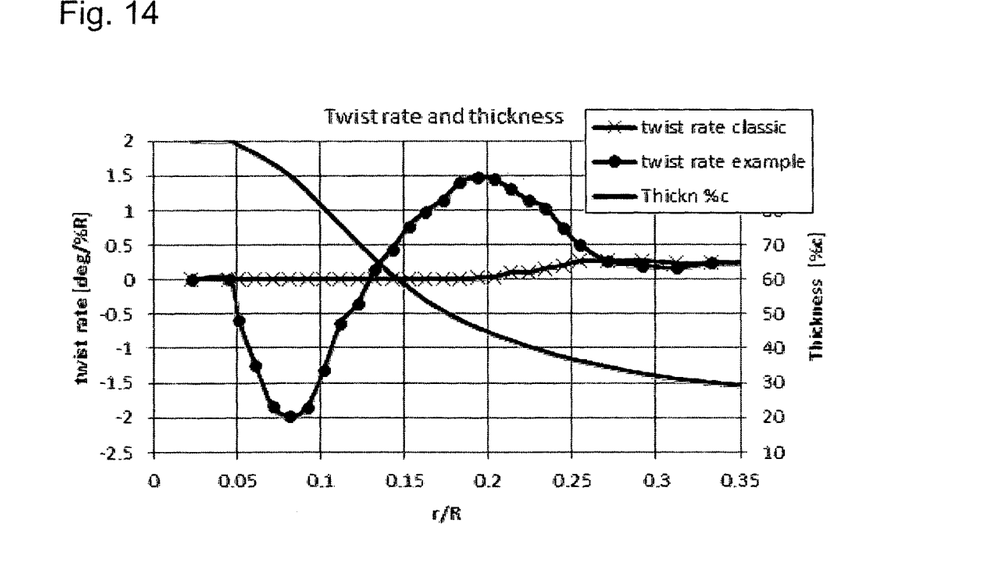
FIG. 14: Twist rate and thickness distribution.

FIG. 14 shows the distribution of the twist rate and the relative thickness according to an embodiment of the invention.

For clarification the flow manipulators like the vortex generators are drawn larger than in reality in several figures. The zigzag pattern of waves in the ribs and the artificial roughness are drawn with a well visible amplitude, while the amplitude of a beneficial embodiment can be larger of smaller.

Although the invention is described inter alia by several examples and figures, one should understand that the invention is not limited hereto. Several changes can be made by the person skilled in the art without getting out of the scope of the claims. An example is the application of the invention on a wind turbine with 2 rotor blades which have a common center part which intersects with the rotational axis. In such a case one should understand that the position L=0 coincides with the position R=0 and that the tip is located at position L=R.

Another example is that of a blade which consists of multiple part in longitudinal direction, then L is related to the assembly of parts which is located between the hub and the blade tip. Also in chord wise direction the blade can consist of more than one part in which case the chord of the from the multiple parts assembled blade should be used.

The person skilled in the art will understand that the invention is applicable to multiple wind turbines, such as wind turbine of both the horizontal axis type and the vertical axis type, onshore and offshore wind turbines, wind turbines with pre-bent blades, wind turbines with a tilt angle and in particular when this tilt angle is between 2° and 7°, wind turbines with a cone angle and in particular when this cone angle is between 2° and 7°, stall regulated and pitch regulated turbines, variable speed and constant speed turbines, turbines in farms, turbines which are retro fitted and get a new rotor, wind turbines for wind classes 1, 2, 3, 4 of 5, and turbulence classes a, b, c, wind turbines with active flaps or active vortex generators or which use aero-elastic tailoring and wind turbines with rotors which have their maximum power coefficient at a design between 2 and 15 and in particular between 4 and 14 and more in particular between 7 and 13, wind turbines with rotors which contain glass fibers of carbon fibers, optionally in combination with a thermo harder of thermo plastic. In addition hereto the person skilled in the art will immediately combine the invention with technology described in the references and will consider this as non-inventive embodiments according to the invention.

One should that the term 'comprises' does not exclude other elements or steps, that the term 'a' does not exclude plurality and that the denotation 'comprises x' should be explained as 'comprises at least x', wherein x e.g. is the number of degrees twist. The references to figures in the claims serve illustration purposes and should not be considered as limiting.

The discussion of the referenced patent texts in this document considers the inventors opinion and has no legal status. Finally the physical explanation in this document is added for illustrative reasons and does not have a relation to the validity of the attached claims.

The invention claimed is:

1. A rotor blade assembly of length L larger than 40 meters for a wind turbine which comprises a fixation side at longitudinal position L=0 for the fixation of the blade to the hub and a tip at the opposite side at longitudinal position L and a suction side which comprises in the range between 5% L and 50% L vortex generators wherein said assembly comprises at 20% L profiles with a thickness of more than 45% c.

2. The rotor blade assembly according to claim 1 wherein the profile thickness at 20% L is more than 50% c.

3. The rotor blade assembly according to claim 1 wherein the profile thickness at 20% L is more than 55% c.

4. The rotor blade assembly according to claim 1 wherein the profile thickness at 40% L is more than 31% c.

5. The rotor blade assembly according to claim 1 wherein the profile thickness at 40% L is more than 33% c.

6. The rotor blade assembly according to claim 1 wherein the profile thickness at 40% L is more than 37% c.

7. The rotor blade assembly according to claim 1 wherein the profile thickness at 60% L is more than 28% c.

8. The rotor blade assembly according to claim 1 wherein the profile thickness at 60% L is more than 30% c.

9. The rotor blade assembly according to claim 1 wherein the profile thickness at 60% L is more than 32% c.

10. The rotor blade assembly according to claim 1 which in blade longitudinal direction comprises a continuous range of profiles of minimally 33% c and maximally 70% c thickness wherein the twist difference in said range is more than 5 degrees.

11. The rotor blade assembly according to claim 1 which in blade longitudinal direction comprises a continuous range of profiles of minimally 40% c and maximally 70% c thickness wherein the twist difference in said range is more than 10 degrees.

12. The rotor blade assembly according to claim 1 wherein the fins of said vortex generators have a height above the blade surface of at least 2% c.

13. A rotor blade assembly according to claim 1 which comprises at the pressure side between 5% L and 25% L an addition or flow blocking measures.

14. The rotor blade assembly according to claim 1 wherein the flow blocking measure protrudes from the profile surface over a distance between 0.2% c and 3% c.

15. The rotor blade assembly according to claim 1 wherein the flow blocking measure comprises a radial flow blocking element of which a cross section with a plane parallel to the local blade surface comprises a concavity.

16. The rotor blade assembly according to claim 1 wherein the flow blocking measure comprises an element with a mounting surface and a flow blocking surface wherein at least 10% of the flow blocking surface has an angle with the blade longitudinal direction of more than 30 degrees, e.g. about 45 degrees.

17. The rotor blade assembly according to claim 1 wherein the flow blocking measures comprise artificial roughness in the range between 1% c at the suction side up to, via the leading edge, 50% c at the pressure side.

18. The rotor blade assembly according to claim 1 which comprises at the pressure side between 5% L and 25% L a radial flow blocking element with a concavity at its pressure side.

19. The rotor blade assembly according to claim 1 wherein at the pressure side, e.g. at the trailing edge the flow blocking measure comprises a three dimensional shape such as wavy strip or a zigzag strip or a repetitive series of elements.

20. The rotor blade assembly according to claim 1 wherein the largest chord is less than 6.5% L.

21. The rotor blade assembly according to claim 1 comprising a profile at 15% L wherein the suction side of said profile between 55% c and 98% c has less slope change than 8 degrees.

22. The rotor blade assembly according to claim 1 comprising a profile at 15% L wherein the pressure side of said profile between 45% c and 98% c has less slope change than 12 degrees.

23. A first and second rotor blade assemblies each according to claim 1 and having a similar shape, wherein the first rotor blade assembly further comprises a first pattern of flow manipulators which is optimized for a first turbine in a first situation and the second rotor blade assembly further comprises a second pattern of flow manipulators which is optimized for a second turbine in a second situation.

* * * * *